United States Patent [19]

Bach et al.

[11] 4,154,059

[45] May 15, 1979

[54] HYDRAULIC BRAKE BOOSTER WITH INTEGRAL ACCUMULATOR

[75] Inventors: Lloyd G. Bach; Arthur K. Brown, Jr., both of South Bend, Ind.; George M. Tam, St. Joseph, Mich.

[73] Assignee: The Bendix Corporation, Southfield, Mich.

[21] Appl. No.: 444,925

[22] Filed: Feb. 22, 1974

Related U.S. Application Data

[63] Continuation-in-part of Ser. No. 317,892, Dec. 26, 1972, abandoned.

[51] Int. Cl.² .................... F15B 1/02; F15B 13/10
[52] U.S. Cl. ........................... 60/404; 60/413; 91/5; 91/6; 91/391 R; 138/31
[58] Field of Search ............... 91/6, 5, 391 R; 60/404, 60/403, 405, 413, 548, 582, DIG. 10; 138/31

[56] References Cited

U.S. PATENT DOCUMENTS

| | | | |
|---|---|---|---|
| 1,776,937 | 9/1930 | Timbs et al. | 138/31 |
| 3,015,345 | 1/1962 | Michael | 138/31 |
| 3,633,363 | 1/1972 | Larsen | 91/6 X |
| 3,638,528 | 2/1972 | Lewis | 91/6 |
| 3,677,006 | 7/1972 | Erdmann | 60/549 |
| 3,677,007 | 7/1972 | Goscenski | 91/6 X |
| 3,719,044 | 3/1973 | Bach | 60/404 |
| 3,751,912 | 8/1973 | Bach | 60/405 |
| 3,898,809 | 8/1975 | Baker | 60/404 |

OTHER PUBLICATIONS

Popular Science, May, 1950, p. 151 only.

*Primary Examiner*—Irwin C. Cohen
*Attorney, Agent, or Firm*—Ken C. Decker; W. N. Antonis

[57] ABSTRACT

A hydraulic brake booster is disclosed which includes an integral accumulator to provide fluid pressure source for emergency failsafe braking. The accumulator includes a bore defined within the booster housing, and a piston slidably mounted in the bore which divides the latter into a pair of fluid compartments between opposite ends of the piston and corresponding ends of the bore. One of the compartments is communicated to the booster inlet port so that the compartment is charged with fluid pressure whenever the pressure level at the inlet port is above some predetermined low value. In one embodiment of the invention, the other compartment is communicated to the fluid pressure reservoir, and a relief valve is carried within the piston which controls flow of fluid between the two compartments. In the other embodiment of the invention, the relief valve is installed in the passage communicating the inlet port to the one compartment, so that when the fluid pressure level in the one compartment reaches a predetermined value, the one compartment is vented to the inlet port. Therefore, when the pressure level in the one compartment reaches some predetermined, relaively high value, the relief valve opens to vent the one compartment, thereby limiting the pressure level in the one compartment to the predetermined level. When a failure occurs in the primary pressure source which normally operates the booster, comunication between the pressure chamber and the one compartment is opened, to use the fluid pressure content of the latter to operate the booster.

15 Claims, 5 Drawing Figures

HYDRAULIC BRAKE BOOSTER WITH INTEGRAL ACCUMULATOR

BACKGROUND OF THE INVENTION

This application is a Continuation-in-Part of our co-pending application Ser. No. 317,892, filed Dec. 26, 1972, and now abandoned, and relates to a hydraulic brake booster having an integral accumulator to provide an emergency power supply.

U.S. Pat. No. 3,638,528, owned by the assignee of the present invention, discloses a hydraulic brake booster which is provided with a bladder-type accumulator of a type well known to those skilled in the art to provide an emergency fluid supply for use when a malfunction prevents operation of the booster using a fluid pressure output of the vehicle's power steering pump. Although this design has proven quite satisfactory in general, the bladder-type accumulator which it requires is relatively expensive. Since the accumulator is not a part of the brake booster, installation of the booster and the accumulator on a vehicle, with the required fluid connection therebetween, is also relatively expensive.

SUMMARY OF THE INVENTION

Therefore, an important object of our invention is to provide a hydraulic brake booster having an accumulator for an emergency power supply, the accumulator being contained in the same housing as the booster.

Another important object of our invention is to provide a spring-type accumulator for use with a hydraulic brake booster.

Still another important object of our invention is to provide means to prevent the accumulator from being charged to too high a pressure level, to thereby prevent possible damage to the booster and accumulator.

Another important object of our invention is to accommodate thermal expansion of the hydraulic fluid stored in the accumulator.

Yet another important object of one embodiment of our invention is to provide, in a brake booster, an accumulator having a piston, and a relief valve carried by the piston that vents the pressure stored in the accumulator to the system reservoir whenever the pressure stored in the accumulator exceeds some predetermined level.

A still further important object of another embodiment of our invention is to provide, in a brake booster having an accumulator, a relief valve which vents the accumulator to the inlet port when the pressure in the accumulator exceeds some predetermined value and the pressure level at the inlet is below the predetermined value.

DETAILED DESCRIPTION OF THE PREFERRED EMBODIMENT

Figure 1:
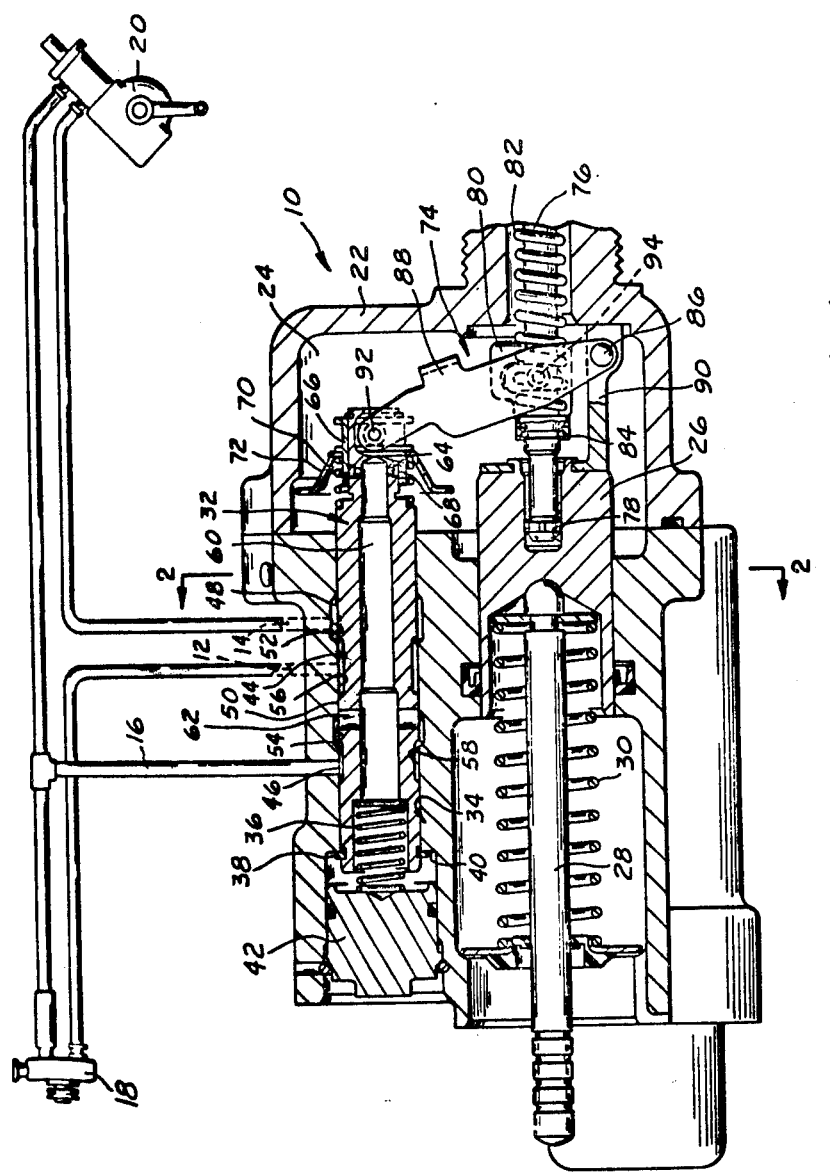
FIG. 1 is a schematic illustration of a vehicle hydraulic system with a brake booster made pursuant to the teachings of our present invention illustrated in cross section, the cross-sectional view being taken substantially along line 1—1 of FIG. 2.
Figure 3:
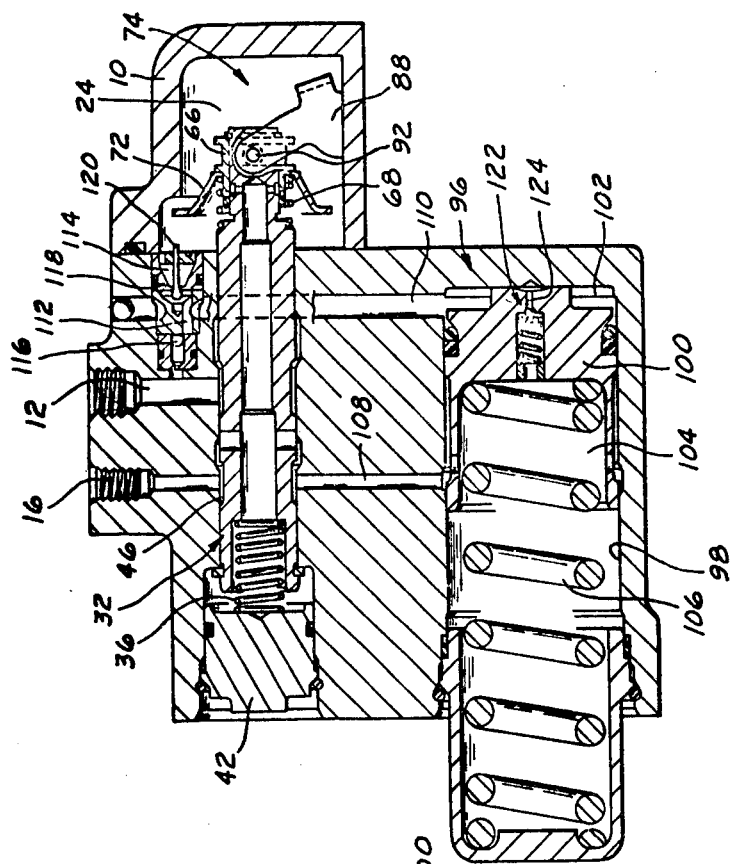
FIG. 3 is a longitudinal cross-sectional view taken substantially along lines 3—3 of FIG. 2.
Figure 2:
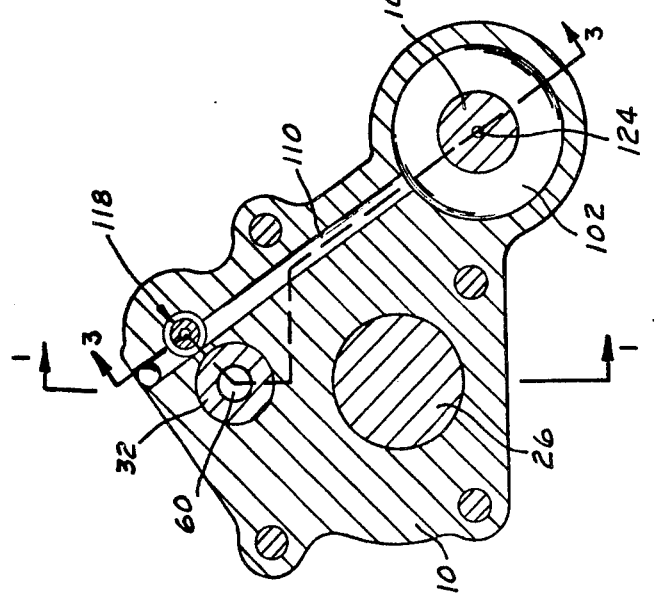
FIG. 2 is a transverse cross-sectional view taken substantially along lines 2—2 of FIG. 1.

Referring now to FIGS. 1-3 of the drawings, a brake booster generally indicated by the numeral 10 includes an inlet port 12, an outlet port 14, and a return or exhaust port 16. The inlet port 12 is communicated to the outlet or high pressure side of the vehicle power steering pump 18, and the outlet port 14 is communicated to the inlet or high pressure side of the vehicle's power steering gear 20. Both the pump 18 and the steering gear 20 are conventional items well known to those skilled in the automotive art. The exhaust port 16 is communicated to a reservoir located at the inlet or low pressure side of the power steering pump 18. The outlet or low pressure side of the steering gear 20, of course, is also communicated to the aforementioned reservoir. The booster 10 includes a housing 22 which defines a pressure chamber 24 therewithin. A piston 26 is slidably mounted within the housing 22, and one end of the piston 26 projects into the pressure chamber 24 and is therefore exposed to the fluid pressure level in the latter. A rod 28 interconnects one end of the piston 26 with a conventional automotive master cylinder (not shown) which is mounted just to the left of the booster housing 22 (viewing FIG. 1). Therefore, movement of the piston 26 to the left viewing FIG. 1 will actuate the master cylinder in a conventional manner well known to those skilled in the art. A return spring 30 yieldably urges the piston to the right viewing FIG. 1, toward the brake-released position illustrated in the drawings.

A spool valve generally indicated by the numeral 32 is slidably mounted in a stepped bore 34 defined within the housing 22. A spring 36 yieldably urges a retainer 38 carried on the spool valve 32 into engagement with the shoulder 40 provided on the bore 34, thereby defining the brake-released position of the spool valve 32 illustrated in FIG. 1. Of course, movement of the spool valve 32 to the left viewing FIG. 1 is limited by engagement of the end of the spool valve 32 with a plug 42 closing the bore 34. This defines the brake fully-applied position of the spool valve 32 in which maximum pressure is communicated into the pressure chamber 24 as will be hereinafter described. The spool valve 32 is provided with grooves 44, 46, and lands 48, 50, which cooperate with corresponding grooves 52, 54, and lands 56, 58, provided on the wall of the bore 34. The groove 44 is communicated with the inlet port 12; the groove 52 is communicated with the outlet port 14; and the groove 46 is communicated with the return or exhaust port 16. A longitudinal passage 60, and radial passages 62, 64, are provided within the spool valve 32 and communicate the groove 54 with the pressure chamber 24. A sleeve 66 is slidably mounted on the end of the spool valve 32 which extends into the pressure chamber 24, and is provided with openings 68. A spring 70 yieldably urges the sleeve 66 to the right viewing FIG. 1, so that substantially uninhibited fluid communication is normally permitted out of the passages 64 through the openings 68. The spring 70 also retains an annular member 72 to the sleeve 66, the purpose of which will be more fully described hereinafter. It should also be noted that the spring constant of the spring 70 is substantially higher than that of the spring 36, so that when a force is applied to the sleeve 66, the spool valve 32 will be shifted without collapse of the spring 70 until the end of the spool valve 32 engages the plug 42.

The brake booster 10 is actuated by actuating means generally indicated by the numeral 74. Actuating means 74 include an input member 76, the right-hand end of which (not shown) is secured to a conventional brake pedal mounted in the operator's compartment of the vehicle, and the left-hand end of which is slidably received in a blind bore 78 provided within the piston 26. A fixture 80 is slidably mounted on the member 76, and a spring 82 yieldably urges the fixture 80 into engagement with a stop ring 84 mounted on the member 76. A first pivot 86 connects one end of lever means 88 to a bracket 90 secured to the piston 26, a second pivot 92 connects the other end of the lever means 88 to the sleeve 66, and a third pivot 94 connects a point intermediate to the ends of the lever means 88 to the fixture 80 carried on the input rod 76.

An accumulator generally indicated by numeral 96 is provided within the brake booster 10 to provide an emergency power supply. Accumulator 96 includes a bore 98 provided within the housing 12, and a piston 100 slidably mounted in the bore 98 which cooperates with the latter to define a first compartment 102 between one end of the piston 100 and a corresponding end of the bore 98 and a second compartment 104 between the opposite end of the piston 100 and the corresponding end of the bore 98. A spring 106 yieldably urges the piston 100 to the right, viewing FIG. 3, toward the position illustrated in the drawing. A passage 108 communicates the chamber 104 with the groove 46 and therefore, with the return or exhaust port 16. Another passage 110 communicates with the compartment 102. Passage 110 is provided with a first branch 112 communicating passage 110 with the inlet port 12 and a second branch 114 which communicates the passage 110 into the pressure chamber 24. A check valve 116 is provided in the branch 112 to permit flow from the inlet port 12 into the compartment 102 through branch 112 whenever the pressure level in the inlet port 12 is higher than the pressure level in the passage 110, but which prevents communication in the reverse direction. Another valve generally indicated by the numeral 118 is provided in the branch 114 and controls communication between the passage 110 and the pressure chamber 24. The valve means 118 is provided with a stem 120 which projects into the pressure chamber 24. Whenever the stem 120 is urged to the left viewing FIG. 3, the valve 118 is opened, to thereby permit fluid communication from the passage 110 into the pressure chamber 24. A relief valve generally indicated by the numeral 122 is provided within the piston 100 in a passage 124 which communicates the compartment 102 with the compartment 104. When the pressure level in the compartment 102 exceeds some predetermined level, the relief valve 122 opens to permit the excess pressure to communicate from the compartment 102 into the compartment 104 and therefore to the system reservoir through the passage 108 and the groove 46. Therefore, the relief valve 122 prevents damage to the booster components by relieving excess pressure in the compartment 102, it being noted that fluid pressure is communicated into the latter whenever the pressure level at the inlet port 12 is greater than the pressure level in the compartment 102.

MODE OF OPERATION OF THE PREFERRED EMBODIMENT

The various components of the brake booster 10 are illustrated in the Figures in the positions which they assume when the brakes of the vehicle are released and in which the accumulator 96 is completely discharged. In this position, substantially uninhibited fluid communication is permitted between the grooves 44 and 52, and therefore substantially the entire fluid pressure output of the pump 18 is circulated throughout the hydraulic system. The groove 54 is communicated with the groove 46, so that the pressure chamber 24 is vented to the aforementioned reservoir through the passages 68, 64, 60 and 62, the grooves 54 and 46, and the exhaust port 16. The spring 30 is therefore permitted to urge the piston 26 toward the brake-released position illustrated in FIG. 1. When a brake application is effected, the input rod 76 is urged to the left, viewing FIG. 1, by the vehicle operator, and since the spring 82 maintains the fixture 80 in engagement with the stop ring 84, movement of the rod 76 to the left pivots the lever means 88 about the first pivot 86, thereby urging the spool valve 32 to the left viewing the FIG. 1, it being remembered that the spring 70 is sufficiently strong to normally prevent relative movement between the sleeve 66 and the spool valve 32. Movement of the spool valve 32 to the left first laps the land 50 with the land 58 to thereby terminate fluid communication between the grooves 54 and 46 to isolate the pressure chamber 24 from the exhaust port 16. Thereafter, the land 50 moves away from the land 56 to permit communication between the grooves 44 and 54. The size of the orifice defined between the lands 48 and 56 is then substantially reduced, to restrict flow between the grooves 44 and 52 to develop pressure in the groove 56, which is communicated into the pressure chamber 24 through the groove 54, and the passages 60, 62, 64, and 68. Fluid pressure in the chamber 24 acts upon the right-hand end of the piston 26 driving the latter to the left viewing FIG. 1 to effect a brake application in the normal manner. When the vehicle operator releases the brakes, the springs 30 and 36 return the piston 26 and the spool valve 32 toward their brake-released positions illustrated in the drawings.

Although normally the fluid pressure output of the vehicle's power steering pump 18 is used to actuate the vehicle brakes, there are times when this pressure source is unavailable when braking is required. For example, the vehicle's engine may die while the vehicle is descending a grade, thereby immediately terminating the fluid pressure output of the power steering pump 18, at a time when the power assist is most required in order to stop the vehicle. Similarly, other malfunctions may prevent the fluid pressure output of the power steering pump from reaching the pressure chamber 24 when a brake application is initiated by the vehicle operator. To provide for this type of emergency, the accumulator generally indicated by the numeral 96 is provided. The accumulator is charged with the fluid pressure output of the pump 18 when the latter operates normally, and therefore, is available after the latter terminates operation.

As is well known to those skilled in the art, operation of the steering gear 20 will build back pressure in the inlet port 12 and in the outlet port 14 of the booster 10. The back pressure developed in the inlet port 12 is communicated into the compartment 102 through the branch 112 and passage 110. Fluid pressure communicated into the compartment 102 urges the piston 100 to the left viewing FIG. 3, against the force of the spring 106, so that a fluid pressure reserve supply is stored in the compartment 102. In order to prevent damage to the booster components, the relief valve 122 opens when some predetermined high pressure level is attained in the compartment 102, to vent the excess fluid pressures into the compartment 104 and therefore to the reservoir through the passage 108, groove 46, and the exhaust port 16. Therefore, when a failure occurs as described above resulting in termination of fluid communication between the pump and the booster chamber 24 when a brake application is effected, the spool valve 32 will first be shifted through its entire stroke, until the end of the latter engages the plug 42. Thereafter, further movement of the input rod 76 shifts the sleeve 66 relative to the spool valve 32, so that the passages 68 are moved away from the passages 64 to prevent communication from the pressure chamber 24, and thereafter, the annular retaining member 74 engages the valve stem 120, urging the latter to the left viewing FIG. 3 to open the valve means 118. Therefore, fluid pressure within the compartment 102 will be communicated into the booster pressure chamber 24 through the passage 110 and the branch 114, so that this fluid pressure in the pressure chamber 24 actuates the piston 26 in the normal manner as described above. Therefore, the booster may be actuated for a finite number of times by using the fluid pressure content stored in the compartment 102. Of course, the fluid content of the compartment 102 will eventually be depleted. When this occurs, further actuation of the booster must be made manually. During manual actuation, the input rod 76 is shifted further to the left, collapsing the spring 82 to move the stop means 84 away from the fixture 80, and to engage the left-hand end of the rod 76 with the end of the blind bore 78, to thereby provide a mechanical connection between the piston 26 and the brake pedal mounted in the vehicle operator's compartment to thereby enable the manual brake application.

DETAILED DESCRIPTION OF THE ALTERNATE EMBODIMENT

Figure 4:
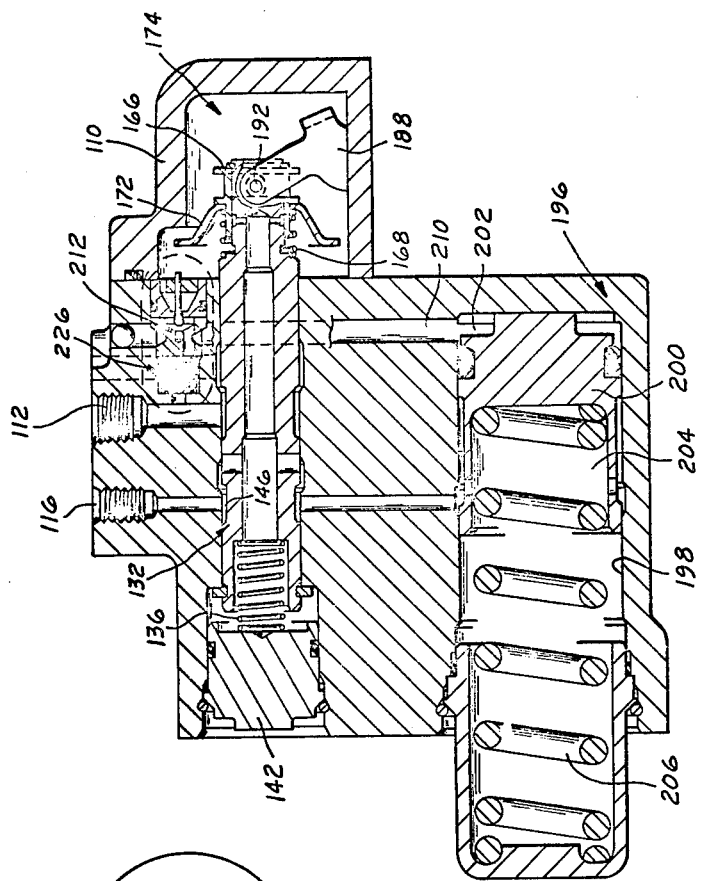
FIG. 4 is a view similar to FIG. 3, but which illustrates another embodiment of our invention.
Figure 5:
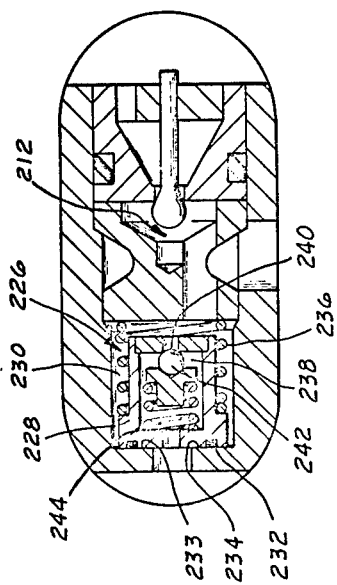
FIG. 5 is an enlarged view of the circumscribed portion of FIG. 4.

Referring now to FIGS. 4 and 5, elements substantially the same as those in the preferred embodiment retain the same reference character as similar elements in the preferred embodiment, but are increased by 100. In this embodiment, the piston 100 incorporating the relief valve 122 is replaced by a solid piston 200, the function of the relief valve being incorporated in a novel valve generally indicated by the numeral 226 which is installed in the first branch 212 in place of the check valve 116.

Valve 226 includes a plunger 228 which is slidably mounted in the branch 212. Circumferentially spaced, axially extending passages 230 are provided through the plunger 228 to permit fluid communication thereacross from the inlet port 112 into the compartment 202. A circumferential sealing ring 232 is mounted on the face 233 of the piston 228, and is adapted to engage shoulder 234 defined in the branch 212. A spring 236 yieldably urges piston 228 toward shoulder 234, so that fluid pressure in the accumulator compartment 202 is prevented from leaking into the inlet port 112 when the fluid pressure level in the port 112 is less than the pressure level in the compartment 202. Of course, when the fluid pressure level in port 112 is greater than the fluid pressure level in compartment 202, the fluid pressure level in port 112 acting against the face 233 of piston 228 urges the latter to the right viewing FIG. 5, permitting fluid to communicate into compartment 202 through the passages 230, and the passage 210. It is noted that the pressure level at inlet port 112 will only be momentarily higher than the pressure level in the compartment 202, since back pressure is developed in inlet port 112 only during a brake application or during operation of the steering gear 20 when the vehicle operator executes a turning maneuver. At all other times, pump 18 merely circulates fluid through the system at a low pressure level. Consequently, compartment 102 is charged only when pressure is developed in the port 112, and the valve 228 prevents pressure from escaping from compartment 202 to to port 112 when fluid pressure in the latter is at a relatively low level. However, due to changes in the ambient temperature, the fluid pressure level in compartment 102 may increase markedly, due to expansion of the fluid. For this reason, a passage 238 is provided through plunger 228, and a valve seat 240 is provided in the passage 238. A sphere 242 is urged into sealing engagement with seat 240 of spring 244, which is sufficiently strong to maintain the sphere against the valve seal until the pressure level in the compartment 202 has attained a dangerously high level. At that time, the sphere moves away from the valve seat to vent compartment 202 to the inlet port 112 which, as pointed out hereinabove, is normally at a relatively low pressure level except during a brake application or when the driver of the vehicle operates the steering gear 20 during a turning maneuver. Furthermore, the maximum pressure level permitted in the compartment 202 is usually greater than the maximum pressure level normally developed by the pump 18.

We claim:
1. In a hydraulic booster:
  a housing having an inlet port communicated to a fluid pressure source and a return port communicated with a reservoir, said housing defining a pressure chamber and a bore therewithin;
  first valve means actuated by the booster operator for controlling fluid communication between said inlet and return ports and said pressure chamber;
  a piston slidably mounted in said bore and defining compartments between opposite ends of the piston and corresponding ends of the bore, resilient means yieldably urging said piston into one of said compartments, relief valve means for communicating said one compartment with the other compartment when the fluid pressure in said one compartment attains a predetermined level, means communicating said other compartment with said return port, and means for diverting a portion of the fluid communicated to said inlet port into said one compartment; and
  second valve means responsive to actuation of said first valve means and failure of fluid pressure to communicate into said chamber to communicate said chamber with the fluid pressure content of said one compartment.
2. The invention of claim 1:
  said relief valve means being mounted in said piston.
3. The invention of claim 1:
  said first valve means being shiftable from a first position venting said pressure chamber to said return port to a second position isolating said pressure chamber from said return port and communicating said pressure chamber with said inlet port; and
  means carried by said first valve means for actuating said second valve means upon movement of the first valve means to the second position and failure of fluid communication into said bore from said source.

4. The invention of claim 3:
said diverting means including passage means communicating with said one compartment having a first branch communicated with said inlet port;
said passage means including a second branch communicated with said pressure chamber, said second valve means being located in said second branch;
said second valve means including a stem extending into said pressure chamber for actuating said second valve means;
said means carried by said first valve means being slidable on said first valve means and carrying a member for operating said stem, said last-mentioned means normally being carried by said first valve means but sliding on said first valve means so that said member operates said stem.

5. The invention of claim 4:
said first valve means being a spool valve slidably mounted in said housing and being provided with lands and grooves cooperating with corresponding lands and grooves on said housing to control communication between said ports and said pressure chamber;
said return port communicating with one of said grooves, said means communicating the other compartment with the return port extending between said one groove and said other compartment.

6. The invention of claim 4:
said spool valve defining a passage therewithin communicating said pressure chamber to said return port when the spool valve is in the first position and to said inlet port when the spool valve is in the second position, said means carried by said first valve means closing communication between the pressure chamber and the passage within the spool valve when said second valve means is actuated.

7. The invention of claim 1:
said first valve means being a spool valve slidably mounted in said housing and being provided with spaced lands and grooves cooperating with corresponding lands and grooves on said housing to control communication between said ports and said housing;
said return port communicating with one of said grooves, said means communicating the other compartment with the return port extending between said one groove and said other compartment.

8. In a hydraulic booster:
a housing having an inlet port communicated to a fluid pressure source and a return port communicated with a reservoir, said housing defining a pressure chamber and a bore therewithin;
a pressure responsive member responsive to the fluid pressure level in said pressure chamber for providing a booster output;
first valve means actuated by the booster operator for controlling fluid communication between said inlet and return ports and said pressure chamber;
a piston slidably mounted in said bore and defining compartments between opposite ends of the piston and corresponding ends of the bore, resilient means yieldably urging said piston into one of said compartments, relief valves for communicating said one compartment with the other compartment when the fluid pressure in said one compartment attains a predetermined level, means communicating said other compartment with said return port, and means for diverting a portion of the fluid communicated to said inlet port into said one compartment; and
second valve means responsive to actuation of said first valve means and failure of fluid pressure to communicate into said chamber to communicate said chamber with the fluid pressure content of said one compartment.

9. In a vehicle hydraulic system including a pump; a hydraulic brake booster having an inlet connected to the outlet of the pump, an outlet, and a return; and a steering gear having an inlet communicated to the outlet of the booster and an outlet communicated to the inlet of the pump, said return being communicated to the pump inlet, said booster including a housing defining a pressure chamber therewithin, valve means in said housing communicating said pressure chamber with said inlet when the valve is actuated and with said return when the valve is released, pressure responsive means responsive to the fluid pressure level in said pressure chamber for providing a booster output, an accumulator for storing fluid for actuation of said booster upon failure of said pump, means for communicating said accumulator with the rest of said hydraulic system, said communicating means including relief valve means responsive to an overpressure condition in said accumulator for communicating said accumulator to a portion of said hydraulic system other than the accumulator until the overpressure condition is dissipated whereupon said relief valve means closes to hold a predetermined pressure level in the accumulator; said housing defining a valve-receiving bore therewithin, said valve means being slidable in said valve-receiving bore and having grooves cooperating with grooves on the wall of the valve receiving bore to control communication between the inlet, the outlet, the return, and the pressure chamber, one of said grooves being communicated to said return, said relief valve means venting said accumulator to said one groove when said overpressure condition exists.

10. In a hydraulic booster, a housing having an inlet communicated to a fluid pressure source and a return; said housing defining a pressure chamber therewithin; first valve means in said housing communicating said pressure chamber with said inlet when the valve is actuated and with said return when the valve is released; pressure responsive means responsive to the fluid pressure level in said pressure chamber for providing a booster output; an accumulator for storing fluid for communication into said pressure chamber for actuation of the booster upon failure of the pressure source; means for communicating fluid pressure from said pressure source into said accumulator, said communicating means including a first flow path communicating said accumulator with said pressure source, check valve means in said first flow path for permitting communication from the inlet into the accumulator when the pressure level at the inlet is greater than the pressure level in the accumulator to prevent communication in the reverse direction to thereby maintain the pressure level in the accumulator, a second flow path communicating said pressure chamber with said accumulator, second valve means in said second flow path responsive to actuation of the booster and failure of the pressure source to communicate the accumulator and the pressure chamber through said second flow path, a third flow path communicating said accumulator with said pressure source, and relief valve means in said third flow path responsive to an overpressure condition in said accumulator, said relief valve means opening to vent said accumulator during said overpressure condition, said relief valve means closing when the overpressure condition no longer exists to thereby maintain the pressure in the accumulator for communication into said pressure chamber upon actuation of the booster and failure of the pump.

11. The invention of claim 10:
    said pressure source having an inlet low pressure side and an outlet high pressure side;
    said third flow path communicating with the inlet low pressure side of the pressure source.

12. The invention of claim 11:
    said accumulator including a bore, an accumulator piston movable in said bore and cooperating with opposite ends thereof to define a pair of chambers between opposite ends of the bore and corresponding ends of the piston, yieldable means in one of said chambers yieldably urging said piston into the other chamber, said communicating means communicating with said other chamber, said third flow path communicating said other chamber with said return.

13. The invention of claim 11:
    said housing defining a valve receiving bore therewithin, said first valve means being slidable in said valve-receiving bore and having grooves with grooves on the wall of the bore receiving bore to control communication between the inlet, the outlet, the return, and the pressure chamber, one of said grooves being communicated to the return, said third flow path communicating with said one groove.

14. The invention of claim 13:
    said third flow path extending through said accumulator piston, said relief valve means being located in said accumulator piston.

15. The invention of claim 12:
    said third flow path extending through said accumulator piston, said relief valve means being located in said accumulator piston.

* * * * *